United States Patent
Francois et al.

(10) Patent No.: US 12,206,852 B2
(45) Date of Patent: Jan. 21, 2025

(54) DERIVATION OF QUANTIZATION MATRICES FOR JOINT CB-BR CODING

(71) Applicant: INTERDIGITAL CE PATENT HOLDINGS, SAS, Paris (FR)

(72) Inventors: Edouard Francois, Bourg des Comptes (FR); Philippe De Lagrange, Betton (FR); Franck Hiron, Chateaubourg (FR); Christophe Chevance, Brece (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 139 days.

(21) Appl. No.: 17/766,005

(22) PCT Filed: Sep. 24, 2020

(86) PCT No.: PCT/EP2020/076752
§ 371 (c)(1),
(2) Date: Apr. 1, 2022

(87) PCT Pub. No.: WO2021/063803
PCT Pub. Date: Apr. 8, 2021

(65) Prior Publication Data
US 2022/0368912 A1    Nov. 17, 2022

(30) Foreign Application Priority Data
Oct. 2, 2019 (EP) .................................. 19306255

(51) Int. Cl.
*H04N 19/126* (2014.01)
*H04N 19/176* (2014.01)
(Continued)

(52) U.S. Cl.
CPC ......... *H04N 19/126* (2014.11); *H04N 19/176* (2014.11); *H04N 19/186* (2014.11); *H04N 19/70* (2014.11)

(58) Field of Classification Search
CPC .. H04N 19/126; H04N 19/176; H04N 19/186; H04N 19/70
See application file for complete search history.

(56) References Cited

U.S. PATENT DOCUMENTS 11,128,891 B2 *   9/2021   Hashimoto ............ H04N 19/12
11,496,739 B2 *  11/2022   Iwamura .............. H04N 19/124
(Continued)

FOREIGN PATENT DOCUMENTS

CN      105103563 A     11/2015
CN      105915913 A      8/2016
(Continued)

OTHER PUBLICATIONS

Iwamura et al, "[AHG15] On scaling list for JCCR", Joint Video Experts Team (JVET) of ITU-T SG 16 WP 3 and ISO/IEC JTC 1/SC 29/WG 11, Document: JVET-P0608r1, 16th Meeting: Geneva, Switzerland, Oct. 1, 2019, 6 pages.

(Continued)

Primary Examiner — Jae N Noh
(74) Attorney, Agent, or Firm — Condo Roccia Koptiw LLP

(57) ABSTRACT

A method for reconstructing a block of an image, said block comprising a plurality of components and being predictively encoded from a reference block, includes if a single quantized residual block is used to jointly encode at least two components of the plurality of components, deriving at least one quantization matrix from a plurality of scaling lists each defined for one component of the plurality of components; and, applying one of the at least one derived quantization (Continued)

matrix to the single quantized residual block to obtain a reconstructed residual block for each of the at least two components.

20 Claims, 10 Drawing Sheets

(51) Int. Cl.
 *H04N 19/186* (2014.01)
 *H04N 19/70* (2014.01)

(56) References Cited

U.S. PATENT DOCUMENTS

2013/0034157 A1 2/2013 Helle et al.
2015/0189289 A1 7/2015 Kim et al.

FOREIGN PATENT DOCUMENTS

GB 2531004 A 4/2016
WO WO 2014166328 A1 10/2014

OTHER PUBLICATIONS

De Lagrange et al., "Non-CE7: Quantization Matrices with Single Identifier and Prediction from Larger Ones", Joint Video Experts Team (JVET) of ITU-T SG 16 WP 3 and ISO/IEC JTC 1/SC 29/WG 11, Document: JVET-O0223-v2, 15th Meeting, Gothenburg, Sweden, Jul. 3, 2019, 14 pages.

Bross et al., "Versatile Video Coding (Draft 6)", Joint Video Experts Team (JVET) of ITU-T SG 16 WP 3 and ISO/IEC JTC 1/SC 29/WG 11, Document: JVET-O2001-VE, 15th Meeting, Gothenburg, Sweden, Jul. 3, 2019, 455 pages.

Iwamura et al, "[AHG15] On scaling list for JCCR", Joint Video Experts Team (JVET) of ITU-T SG 16 WP 3 and ISO/IEC JTC 1/SC 29/WG 11, Document: JVET-P0608, 16th Meeting: Geneva, Switzerland, Oct. 1, 2019, 6 pages.

* cited by examiner

DERIVATION OF QUANTIZATION MATRICES FOR JOINT CB-BR CODING

CROSS REFERENCE TO RELATED APPLICATIONS

This application is a U.S. National Stage Application under 35 U.S.C. 371 of International Patent Application No. PCT/EP2020/076752, filed Sep. 24, 2020, which is incorporated herein by reference in its entirety.

This application claims the benefit of European Patent Application No. 19306255.1, filed Oct. 2, 2019, which is incorporated herein by reference in its entirety.

TECHNICAL FIELD

At least one of the present embodiments generally relates to a method or an apparatus for video encoding or decoding, and more particularly, to a method or an apparatus for efficiently providing quantization matrices for a Joint Cb-Cr Residual coding (JCCR), for the encoding or decoding of the video.

BACKGROUND

To achieve high compression efficiency, image and video coding schemes usually employ prediction, including motion vector prediction, and transformation to leverage spatial and temporal redundancy in the video content. Generally, intra or inter prediction is used to exploit the intra or inter frame correlation, then the differences between the original image and the predicted image, often denoted as prediction errors or prediction residuals, are transformed, quantized, and entropy coded. To reconstruct the video, the compressed data are decoded by inverse processes corresponding to the entropy coding, quantization, transformation, and prediction.

Recent additions to video compression technology include various industry standards, versions of the reference software and/or documentations such as Joint Exploration Model (JEM) and later VTM (Versatile Video Coding (WC) Test Model) being developed by the JVET (Joint Video Exploration Team) group. The aim is to make further improvements to the existing HEVC (High Efficiency Video Coding) standard.

SUMMARY

In a first aspect, one or more of the present embodiments provide a method for reconstructing a block of an image, said block comprising a plurality of components and being predictively encoded from a reference block, the method comprising:
  if a single quantized residual block is used to jointly encode at least two components of the plurality of components, deriving at least one quantization matrix from a plurality of scaling lists each defined for one component of the plurality of components; and,
  applying one of the at least one derived quantization matrix to the single quantized residual block to obtain a reconstructed residual block for each of the at least two components.

In an embodiment, the single quantized residual block is used to jointly encode two chrominance components, and at least one derived quantization matrix is derived from a first scaling list defined for a first chroma component and a second scaling list defined for a second chroma component.

In an embodiment, the deriving consists in applying a function to scaling factor matrices derived from the plurality of scaling lists representative of an average or a weighted average of said scaling factor matrices.

In an embodiment, the plurality of scaling lists comprises scaling lists derived from scaling lists signaled in a bitstream representative of the image.

In an embodiment, when a single quantized residual block is used to jointly encode at least two components of the plurality, a syntax element indicates if the quantization matrix applied to the single quantized residual block is derived from the plurality of scaling lists or equal to one scaling list defined for one component of the plurality of components.

In a second aspect, one or more of the present embodiments provide a device for reconstructing a block of an image, said block comprising a plurality of components and being predictively encoded from a reference block, the device comprising:
  means for deriving at least one quantization matrix from a plurality of scaling lists each defined for one component of the plurality of components if a single quantized residual block is used to jointly encode at least two components of the plurality of components; and, means for applying one of the at least one derived quantization matrix to the single quantized residual block to obtain a reconstructed residual block for each of the at least two components.

In an embodiment, the single quantized residual block is used to jointly encode two chrominance components, and at least one derived quantization matrix is derived from a first scaling list defined for a first chroma component and a second scaling list defined for a second chroma component.

In an embodiment, the deriving consists in applying a function to scaling factor matrices derived from the plurality of scaling lists representative of an average or a weighted average of said scaling factor matrices.

In an embodiment, the plurality of scaling lists comprises scaling lists derived from scaling lists signaled in a bitstream representative of the image.

In an embodiment, when a single quantized residual block is used to jointly encode at least two components of the plurality, a syntax element indicates if the quantization matrix applied to the single quantized residual block is derived from the plurality of scaling lists or equal to one scaling list defined for one component of the plurality of components.

In a third aspect, one or more of the present embodiments provide an encoding method comprising the method according to the first aspect.

In a fourth aspect, one or more of the present embodiments provide a decoding method comprising the method according to the first aspect.

In a fifth aspect, one or more of the present embodiments provide an encoding apparatus comprising the device according to the second aspect.

In a sixth aspect, one or more of the present embodiments provide a decoding apparatus comprising the device according to the second aspect.

In a seventh aspect, one or more of the present embodiments provide an apparatus comprising the encoding apparatus according to the fifth aspect and/or the decoding apparatus according to the sixth aspect.

In an eighth aspect, one or more of the present embodiments provide a signal generated by the encoding method of the third aspect or by the encoding apparatus of the fifth aspect or by the apparatus of the seventh aspect.

In a ninth aspect, one or more of the present embodiments provide a computer program comprising program code instructions for implementing the method according to the first aspect or according to the third or fourth aspect.

In a tenth aspect, one or more of the present embodiments provide an information storage medium storing program code instructions for implementing the method according to the first aspect or according to the third or fourth aspects.

DETAILED DESCRIPTION

Figure 1:
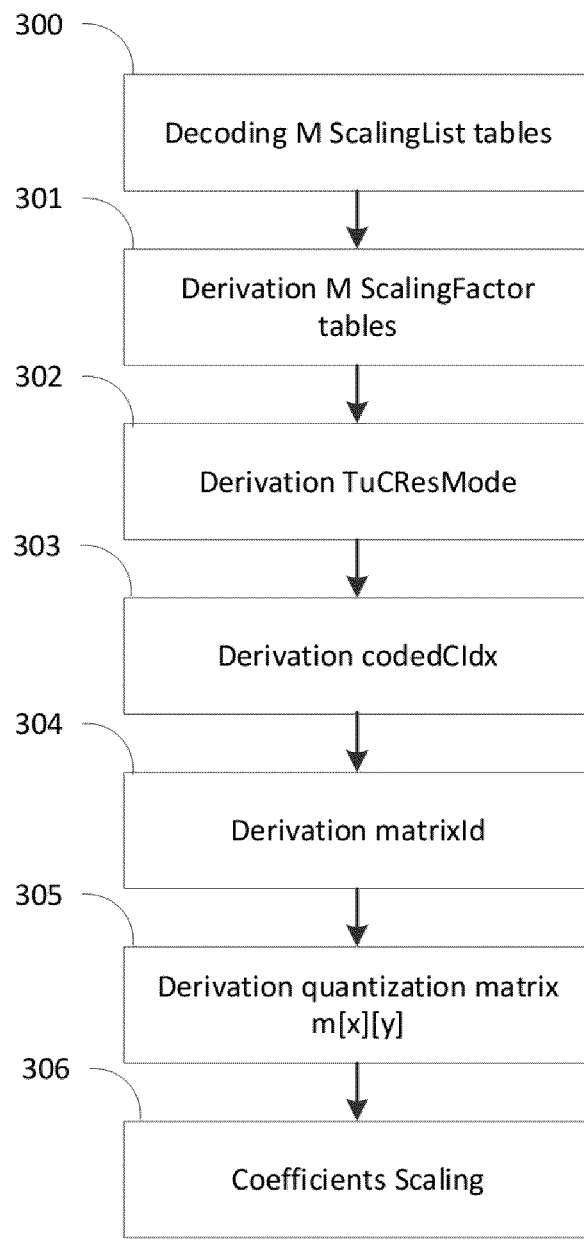
FIG. 1 depicts a simplified block diagram of the residual coefficients scaling process.

The general aspects are described here in the field of video compression. These aspects aim at improving compression and/or decompression efficiency compared to existing video compression systems.

One or more aspects of the present embodiments relate to the relation between two tools of WC, Quantization Matrices, and a chroma coding mode called Joint Cb-Cr Residual coding (JCCR) mode.

Joint Cb/Cr Residual Coding
Concept of Joint Cb/Cr Residual Coding (JCCR)

In one or more basic embodiments, the Cb and Cr chroma prediction residual of a chroma Transform Unit (TU) or Transform Block (TB) can be coded according to two modes. In a first mode, the Cb residual and the Cr residual are coded separately. A second mode, named Joint Cb-Cr (JCCR), consists in jointly coding the Cb and Cr chroma residuals. When the JCCR mode is activated, one single joint residual block is signaled for both Cb and Cr blocks in the same TU. Then, the Cb residual is set equal to the signaled residual, and the Cr residual is set to the signaled residual, or to the opposite of the signaled residual (opposite signs of the signaled residual samples). A slice level flag (slice_joint_cbcr_sign_flag) is coded to indicate which of these two options applies for the current slice.

JCCR Mode Control

In one of more basic embodiments, the JCCR mode is first controlled by a flag signaled at SPS level (sps_joint_cbcr_enabled_flag). For a TU at relative position x0, y0 in the picture (TU top left chroma sample position), when sps_joint_cbcr_enabled_flag indicates the enabling of JCCR, another syntax element tu_joint_cbcr_residual_flag [x0][y0] is signalled at TU level.

Two other syntax elements, tu_cbf_cb[x0][y0] and tu_cbf_cr[x0][y0], indicating if the Cb and Cr blocks, respectively, have non-zero residual samples or not ("cbf" stands for "coded block flag"), are also used to control JCCR. The JCCR mode performs the mixing of Cb and Cr residual only if tu_cbf_cb[x0][y0] and tu_cbf_cr[x0][y0] are both equal to 1.

JCCR Process

The derivation of the residual samples block resSamples [x][y] of the TU at position x0,y0, for a chroma component of index cIdx (1 for Cb, 2 for Cr) comprises the following steps, given the input residual values res[x][y] resulting from the inverse quantization and inverse transform of the decoded residual coefficients.

Step 1—Derivation of a Parameter TuCResMode

Depending on tu_joint_cbcr_residual_flag[x0][y0], tu_cbf_cb[x0][y0], and tu_cbf_cr[x0][y0], the variable TuCResMode[x0][y0] is derived as follows:

If tu_joint_cbcr_residual_flag[x0][y0] is equal to 0, the variable TuCResMode[x0][y0] is set equal to 0;

Otherwise, if tu_cbf_cb[x0][y0] is equal to 1 and tu_cbf_cr[x0][y0] is equal to 0, the variable TuCResMode[x0][y0] is set equal to 1;

Otherwise, if tu_cbf_cb[x0][y0] is equal to 1, the variable TuCResMode[x0][y0] is set equal to 2;

Otherwise, the variable TuCResMode[x0][y0] is set equal to 3.

Step 2—Derivation of a Parameter codedCIdx

The variable codedCIdx is derived as follows:

If cIdx is equal to 0 or TuCResMode[xTbY][yTbY] is equal to 0, codedCIdx is set equal to cIdx.

Otherwise, if TuCResMode[xTbY][yTbY] is equal to 1 or 2, codedCIdx is set equal to 1.

Otherwise, codedCIdx is set equal to 2.

wherein xTbY, yTbY are picture locations equivalent to x0, y0 mentioned above.

For sake of simplicity, the indexes of the parameters are removed in discussions and explanations of various embodiments. For instance, tu_joint_cbcr_residual_flag[x0][y0] is simply noted tu_joint_cbcr_residual_flag.

Step 3—Derivation of the Residual Samples resSamples of the Transform Block

The residual signal of the chroma components Cb and Cr (when tu_joint_cbcr_residual_flag=1 and at least one of tu_cbf_cb or tu_cbf_crCb is equal to 1) is reconstructed depending on tu_cbf_cb and tu_cbf_cr and TuCrResMode, as shown in the table below.

| tu_cbf_cb | tu_cbf_cr | TuCResMode | derivation_of Cb and Cr residuals |
|---|---|---|---|
| 1 | 0 | 1 | resCb[x][y] = resJointC[x][y] |
|  |  |  | resCr[x][y] = (CSign * resJointC[x][y]) >> 1 |
| 1 | 1 | 2 | resCb[x][y] = resJointC[x][y] |
|  |  |  | resCr[x][y] = CSign * resJointC[x][y] |

| tu_cbf_cb | tu_cbf_cr | TuCResMode | derivation_of Cb and Cr residuals |
|---|---|---|---|
| 0 | 1 | 3 | resCb[x][y] = (CSign * resJointC[x][y]) >> 1<br>resCr[x][y] = resJointC[x][y] | where cSign=(1−2*slice_joint_cbcr_sign_flag).

The case of TuCResMode=2 corresponds to the case where the Cb and Cr residuals are jointly coded. It is highlighted in grey in the table.

Quantization Parameter Control

For the quantization/scaling process of chroma residual transform coefficients, the current VVC draft enables signaling separate syntax elements to control independently the chroma Quantization Parameter (QP) for the CbCr, and JCCR residuals (when the JCCR mode is enabled at slice level). They are used to derive the chroma QP of Cb, Cr, and JCCR residuals, noted $Qp'_{Cb}$, $Qp'_{Cr}$ and $Qp'_{CbCr}$.

The option of using an independent control of the chroma QP for JCCR is justified by the fact that the residual energy distribution of the transform block with JCCR might be different from that without JCCR. However, one or more embodiments of VVC do not support specific scaling lists/quantization matrices for the transform block coded with JCCR.

Scaling Control by Quantization Matrices

Dequantization in HEVC, with Quantization Matrix as Scale Factor

The HEVC specification allows the use of quantization matrices in the dequantization (inverse quantization) process, where coded block frequency-transformed coefficients are scaled by the current quantization step and further scaled by a quantization matrix (QM) as follows:

$$d[x][y]=\text{Clip3}(\text{coeffMin},\text{coeffMax},((\text{TransCoeffLevel}[xTbY][yTbY][cIdx][x][y]*m[x][y]*\text{levelScale}[qP\%6]<<(qP/6))+(1<<(\text{bdShift}-1)))>>\text{bdShift})$$

where:
- TransCoeffLevel[ . . . ] are the transformed coefficients absolute values for the current block identified by its spatial coordinates xTbY, yTbY and its component index cIdx.
- x and y are the horizontal/vertical frequency indices.
- qP is the current quantization parameter.
- the multiplication by levelScale[qP %6] and left shift by (qP/6) is the equivalent of the multiplication by quantization step qStep=(levelScale[qP %6]<<(qP/6))
- m[ . . . ][ . . . ] is the two-dimensional quantization matrix
- bdShift is an additional scaling factor to account for image sample bit depth. The term (1<<(bdShift−1)) serves the purpose of rounding to the nearest integer.
- d[ . . . ] are the resulting dequantized transformed coefficients absolute values Quantization Matrices of One or More Basic Embodiments In one or more basic embodiments, a similar quantization matrix m[ . . . ][ . . . ] is used in the inverse quantization/scaling process, as described in clause 8.7.3 "Scaling process for transform coefficients" of the current VVC. Its derivation process is described below. The matrix m[ . . . ][ . . . ] is derived from the scaling_list_data, whose syntax is shown below:

|  | Descriptor |
|---|---|
| scaling_list_data( ) {<br>  for( sizeId = 1; sizeId < 7; sizeId++ )<br>    for( matrixId = 0; matrixId < 6; matrixId ++ ) {<br>      if( ! ( (( sizeId == 1 ) && ( matrixId % 3 == 0 ) ) || (( sizeId == 6 )<br>&& ( matrixId % 3 != 0 ) )) ) {<br>        scaling_list_pred_mode_flag[ sizeId ][ matrixId ] | u(1) |
|         if( !scaling_list_pred_mode_flag[ sizeId ][ matrixId ] )<br>          scaling_list_pred_matrix_id_delta[ sizeId ][ matrixId ] | ue(v) |
|         else {<br>          nextCoef = 8<br>          coefNum = Min( 64, ( 1 << ( sizeId << 1 ) ) )<br>          if( sizeId > 3 ) {<br>            scaling_list_dc_coef_minus8[ sizeId − 4 ][ matrixId ] | se(v) |
|             nextCoef =<br>scaling_list_dc_coef_minus8[ sizeId − 4 ][ matrixId ] + 8<br>          }<br>          for( i = 0; i < coefNum; i++ ) {<br>            x = DiagScanOrder[ 3 ][ 3 ][ i ][ 0 ]<br>            y = DiagScanOrder[ 3 ][ 3 ][ i ][ 1 ]<br>            if ( !(sizeId==6 && x>=4 && y>=4) ) {<br>              scaling_list_delta_coef | se(v) |
|               nextCoef =<br>( nextCoef + scaling_list_delta_coef + 256 ) % 256<br>              ScalingList[ sizeId ][ matrixId ][ i ] = nextCoef<br>            }<br>          }<br>        }<br>      }<br>    }<br>  }<br>} |  |

Compared to HEVC, WC provides more quantization matrices due to a higher number of block sizes supported by the specification. It is observed that tables ScalingList[sizeId][matrixId][i] are indexed by sizeId (from 1 to 6) and matrixId (from 0 to 5). Therefore 36 tables are used.

Scaling Process for Transform Coefficients

In the scaling process for transform coefficients, the quantization parameter qP is set to $Qp'_{CbCr}$ when TuCResMode[xTbY][yTbY] is equal to 2.

The intermediate quantization matrix m[x][y] is derived as follows:

If sps_scaling_list_enabled_flag is equal to 0 (no QM) or transform_skip_flag[xTbY][yTbY] is equal to 1 (transform is skipped for the block)
m[x][y]=16

Otherwise, the following applies:
m[x][y]=ScalingFactor[Log 2(nTbW)][Log 2(nTbH)][matrixId][x][y]

The 5-dimension array ScalingFactor is derived from the ScalingList matrices. The 2 first dimensions relate to the TU horizontal and vertical dimensions (nTbW and nTbH), the 3rd dimension relates to the parameter matrixId, and the 2 last dimensions to the horizontal/vertical frequency indices.

For example, in one or more basic embodiments, the elements of the quantization matrix of size 2×2, ScalingFactor[1][1][matrixId][x][y], with i=0 . . . 3, matrixId=1, 2, 4, 5, are derived as follows:

$x$=DiagScanOrder[1][1][$i$][0]

$y$=DiagScanOrder[1][1][$i$][1]

ScalingFactor[1][1][matrixId][$x$][$y$]=ScalingList[1][matrixId][$i$]

where DiagScanOrder is a table mapping an index to locations in a 2D array according to a diagonal scanning.

The parameter matrixId, derived from the Table 7-6 (shown below), is based on the prediction mode CuPredMode of the Coding Unit containing the considered TU and on the value of cIdx. This parameter is set to codedCId. That is, as explained above (Step 2), it is set to 1 when TuCResMode[xTbY][yTbY] is equal to 2. This means that when TuCResMode[xTbY][yTbY] is equal to 2 (that is, JCCR mode mixing the Cb and Cr residual blocks), the scaling list for Cb component is used.

TABLE 7-6

Specification of matrixId according to sizeId, prediction mode and colour component

| sizeId | CuPredMode | cIdx (Colour component) | matrixId |
| --- | --- | --- | --- |
| 2, 3, 4, 5, 6 | MODE_INTRA | 0 (Y) | 0 |
| 1, 2, 3, 4, 5, 6 | MODE_INTRA | 1 (Cb) | 1 |
| 1, 2, 3, 4, 5, 6 | MODE_INTRA | 2 (Cr) | 2 |
| 2, 3, 4, 5, 6 | MODE_INTER, MODE_IBC | 0 (Y) | 3 |
| 1, 2, 3, 4, 5, 6 | MODE_INTER, MODE_IBC | 1 (Cb) | 4 |
| 1, 2, 3, 4, 5, 6 | MODE_INTER, MODE_IBC | 2 (Cr) | 5 |

FIG. 1 depicts a simplified block diagram of the residual coefficients scaling process. In step 300, M scaling list matrices are decoded. In step 301, the M scalingFactor matrices are derived from the ScalingList matrices. In WC, M=6*6=36. In step 302 the parameter TuCResMode is derived. In step 303, the parameter codedCIdx is derived. In this step, in VVC, codedCIdx is set equal to 1 when TuCResMode is equal to 1 or 2. In step 304, matrixId is derived. In particular, due to the previous step, matrixId is derived from a color component index set to 1 when TuCResMode is equal to 2. In step 305, the quantization matrix m[x][y] is derived from the scalingFactor matrices, matrixId and other input parameters related to the TU size. In step 306, the scaling of the decoded coefficients is achieved based on m[x][y] and the chroma QP associated to the considered residual (luma Y, or chroma Cb, Cr or JCCR).

The processes of the three more relevant steps shown in FIG. 1 in case of JCCR mode is used are further detailed below (lines applying when JCCR is used, and cbf of Cb and Cr blocks are 1 are highlighted in grey):

Step 302—Derivation of codedCIdx

If cIdx is equal to 0 or TuCResMode[xTbY][yTbY] is equal to 0, codedCIdx is set equal to cIdx.

Otherwise, if TuCResMode[xTbY][yTbY] is equal to 1 or 2, codedCIdx is set equal to 1.

Otherwise, codedCIdx is set equal to 2.

Step 303—Derivation of MatrixId matrixId is derived from the input parameters sizeId, CuPredMode and cIdx, based on the table below.

| sizeId | CuPredMode | cIdx (Colour component) | matrixId |
| --- | --- | --- | --- |
| 2, 3, 4, 5, 6 | MODE_INTRA | 0 (Y) | 0 |
| 1, 2, 3, 4, 5, 6 | MODE_INTRA | 1 (Cb) | 1 |
| 1, 2, 3, 4, 5, 6 | MODE_INTRA | 2 (Cr) | 2 |
| 2, 3, 4, 5, 6 | MODE_INTER, MODE_IBC | 0 (Y) | 3 |
| 1, 2, 3, 4, 5, 6 | MODE_INTER, MODE_IBC | 1 (Cb) | 4 |
| 1, 2, 3, 4, 5, 6 | MODE_INTER, MODE_IBC | 2 (Cr) | 5 |

Step 304—Derivation of the Quantization Matrix m[x][y]

m[x][y] is derived as follows:

$m[x][y]$=Scaling Factor[Log 2($nTbW$)][Log 2($nTbH$)][matrixId][$x$][$y$]

As stated above, one or more basic embodiments do not support quantization matrices specific to transform blocks coded with JCCR. When JCCR applies, the quantization matrices for Cb component are used for JCCR. However, the residual energy distribution of the transform block with JCCR might be different from that without JCCR. This can result in visual quality degradation or compression efficiency loss.

Other solutions propose to introduce 2 additional scaling lists for JCCR for each block size, for the case of JCCR with TuCResMode equal to 2.

When a given chroma transform block is coded with JCCR and both tu_cbf_cb and tu_cbf_cr are equal to 1, scaling list for JCCR is used. The following texts highlighted in grey are proposed specification changes of one or more basic embodiments.

Descriptor

```
scaling_list_data( ) {
  for( sizeId = 1; sizeId < 7; sizeId++ )
    for( matrixId = 0; matrixId < 8; matrixId ++ ) {
```

-continued

| | Descriptor |
|---|---|
| if( ! ( ( ( sizeId == 1 ) && ( matrixId % 4 == 0 ) ) \|   \| ( ( sizeId == 6 ) && ( matrixId % 4 != 0 ) ) ) ) {       scaling_list_pred_mode_flag[ sizeId ][ matrixId ] | u(1) |
| ... | |

Table 7-6 is modified as follows in one or more embodiments:

Modified Table 7-6 - Specification of matrixId according to sizeId, prediction mode and colour component

| sizeId | CuPredMode | cIdx (Colour component) | matrixId |
|---|---|---|---|
| 2, 3, 4, 5, 6 | MODE_INTRA | 0 (Y) | 0 |
| 1, 2, 3, 4, 5, 6 | MODE_INTRA | 1 (Cb) | 1 |
| 1, 2, 3, 4, 5, 6 | MODE_INTRA | 2 (Cr) | 2 |
| 1, 2, 3, 4, 5, 6 | MODE_INTRA | 1 (Cb when TuCResMode is 2) | 3 |
| 2, 3, 4, 5, 6 | MODE_INTER, MODE_IBC | 0 (Y) | 4 |
| 1, 2, 3, 4, 5, 6 | MODE_INTER, MODE_IBC | 1 (Cb) | 5 |
| 1, 2, 3, 4, 5, 6 | MODE_INTER, MODE_IBC | 2 (Cr) | 6 |
| 1, 2, 3, 4, 5, 6 | MODE_INTER, MODE_IBC | 1 (Cb when TuCResMode is 2) | 7 |

This results in adding 2*6 more scaling list tables. However, this uses more signalling bits, and requires more memory to store the matrices.

Accordingly, one or more aspects of further embodiments avoid signaling new scaling list matrices by instead making the quantization matrices used in the inverse quantization process depending on both the scaling factors associated with the Cb and Cr color components when JCCR mode is applied. For sake of simplicity, this will be noted as Cb and Cr scaling factors. One or more aspects of various embodiments use quantization matrices adapted or specific to JCCR mode.

First Additional Embodiment

In a first additional embodiment, the derivation of the quantization matrix m[x][y] is modified when JCCR is used. When JCCR is used, m[x][y] is derived from the ScalingFactor matrices applying to Cb and Cr components. This solution advantageously avoids signalling additional scaling lists for the JCCR case. Using a mixing of the ScalingFactor matrices applying to Cb and Cr components appears to be appropriate since the JCCR residual signal is a mixing of the Cb and Cr residual.

The process of derivation of the quantization matrix m[x][y] (step 304) is modified as follows (changes compared to one or more basic embodiments are highlighted in grey):

If TuCResMode[xTbY][yTbY] is not equal to 2, the following applies.

$m[x][y] = ScalingFactor[Log\ 2(nTbW)][Log\ 2(nTbH)][matrixId][x][y]$

Otherwise, the following applies.

$m[x][y] = f(ScalingFactor[Log\ 2(nTbW)][Log\ 2(nTbH)][matrixId1][x][y], ScalingFactor[Log\ 2(nTbW)][Log\ 2(nTbH)][matrixId2][x][y])$ where
f(A, B) is a pre-defined function mixing the values A and B
matrixId1 is associated to the Cb component, derived from the Table 7-6 with an index corresponding to the Cb component (typically cIdx set to 1 in Table 7-6)
matrixId2 is associated to the Cr component, derived from the Table 7-6 with an index corresponding to the Cr component (typically cIdx set to 2 in Table 7-6)

Figure 4:
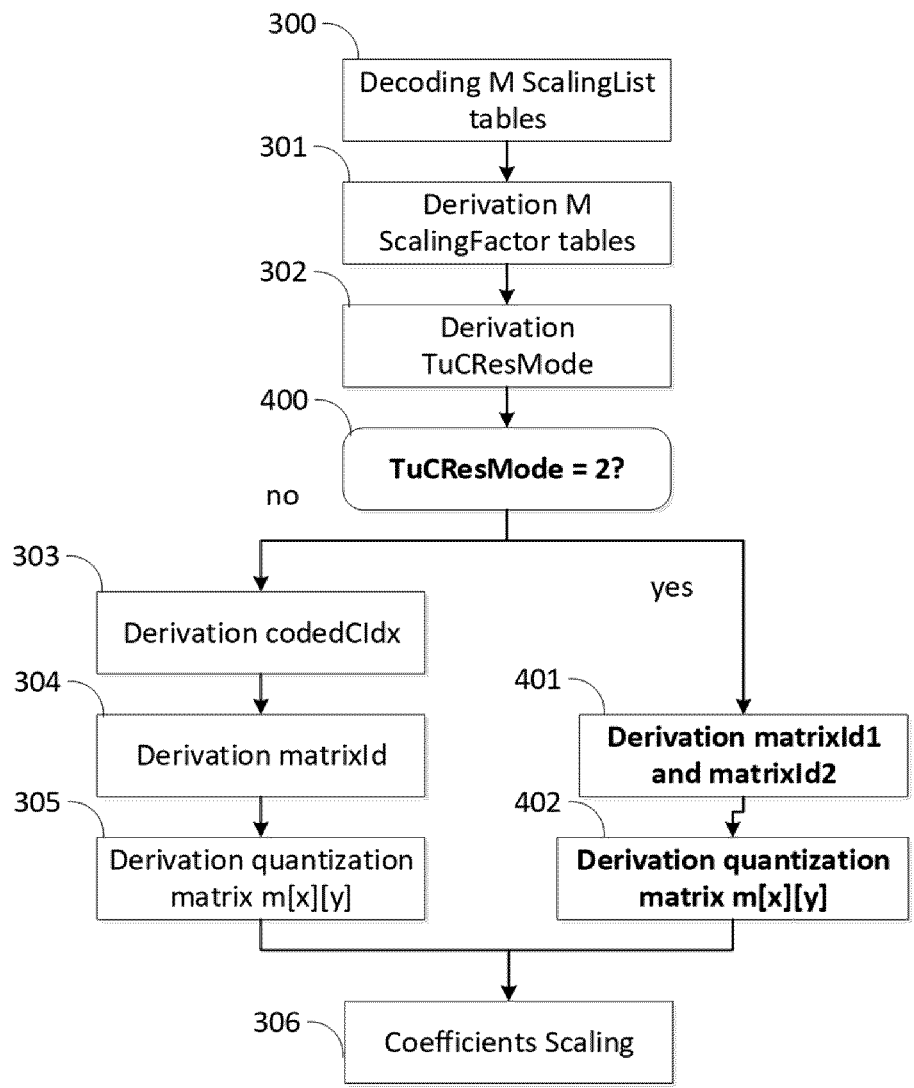
FIG. 4 provides an example of block diagram of the scaling process implementing one embodiment.

FIG. 4 provides an example of block diagram of the scaling process implementing the first embodiment. Compared to the process depicted in FIG. 1, three steps are added (indicated in in bold font in the figure). After step 302 of derivation of TuCResMode, step 400 checks if TuCResMode is equal to 2. If TuCResMode is not equal to 2, the step 303 (derivation of codedCIdx), 304 (derivation of matrixId) and 305 (derivation of the quantization matrix m[x][y]) apply as in the prior-art process of FIG. 1. If TuCResMode is equal to 2, matrixId1 and matrixId2 are derived in step 401. Then in step 402, m[x][y] is derived based on the ScalingFactor tables associated with matrixId1 and matrixId2.

Examples of Function f( )
f( ) aims at mixing two values:

$A = ScalingFactor[Log\ 2(nTbW)][Log\ 2(nTbH)][matrixId1][x][y]$ and $B = ScalingFactor[Log\ 2(nTbW)][Log\ 2(nTbH)][matrixId2][x][y]$ Different examples of the function are provided below:

$f(A,B) = (A+B)/2 = (A+B) >> 1$ $f(A,B) = (A+B+1)/2 = (A+B+1) >> 1$ $f(A,B) = (a*A + b*B + (a+b)/2)/(a+b)$ where a and b are positive values, either pre-defined parameters, or parameters signaled or derived from signaled syntax elements
in a variant, a and b are constrained to be such that (a+b) be equal to $2^K$, K being a pre-defined integer value, or a value signaled in the stream.

In this later case, f( ) can be expressed as:

$f(A,B) = (a*A + (2^K - a)*B + 2^{(K-1)})/2^K = (a*A + (2^K - a)*B + 2^{(K-1)}) >> K$ where x>>y corresponds to the arithmetic right shift of a two's complement integer representation of x by y binary digits, and x^y specifies x to the power of y.

Second Additional Embodiment

In a second additional embodiment, new ScalingFactor matrices are added. But these matrices are not signaled in the bitstream, but inferred from the ScalingFactor matrices used for the Cb and Cr components. As in the first embodiment, this solution advantageously avoids signalling additional scaling list matrices.

The derivation of the additional ScalingFactor matrices used for JCCR case (based on one or more basic embodiments in which 2*6 matrices are used) is achieved as follows.

for(sizeId=1;sizeId<7;sizeId++)
  for each horizontal/vertical frequency index x and y of a square TU of size specified by sizeId ScalingFactor[sizeId][sizeId][6][x][y]=f(ScalingFactor[sizeId][sizeId][1][x][y],ScalingFactor[sizeId][sizeId][2][x][y])

ScalingFactor[sizeId][sizeId][7][x][y]=f(ScalingFactor[sizeId][sizeId][4][x][y],ScalingFactor[sizeId][sizeId][5][x][y])

The function f( ) can be one of the examples given above. Table 7-6 is modified as follows in one or more embodiments:

Modified Table 7-6 - Specification of matrixId according to sizeId, prediction mode and colour component

| sizeId | CuPredMode | cIdx (Colour component) | matrixId |
|---|---|---|---|
| 2, 3, 4, 5, 6 | MODE_INTRA | 0 (Y) | 0 |
| 1, 2, 3, 4, 5, 6 | MODE_INTRA | 1 (Cb) | 1 |
| 1, 2, 3, 4, 5, 6 | MODE_INTRA | 2 (Cr) | 2 |
| 2, 3, 4, 5, 6 | MODE_INTER, MODE_IBC | 0 (Y) | 3 |
| 1, 2, 3, 4, 5, 6 | MODE_INTER, MODE_IBC | 1 (Cb) | 4 |
| 1, 2, 3, 4, 5, 6 | MODE_INTER, MODE_IBC | 2 (Cr) | 5 |
| 1, 2, 3, 4, 5, 6 | MODE_INTRA | 1 (Cb when TuCResMode is 2) | 6 |
| 1, 2, 3, 4, 5, 6 | MODE_INTER, MODE_IBC | 1 (Cb when TuCResMode is 2) | 7 |

Figure 5:
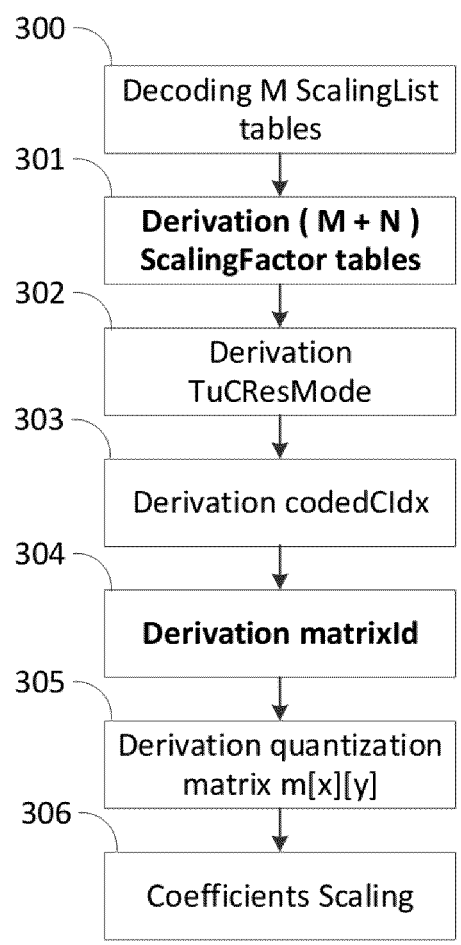
FIG. 5 provides an example of block diagram of the scaling process implementing another embodiment.

The process is illustrated in FIG. 5. Compared to FIG. 1, step 301 is modified, since (M+N) ScalingFactor matrices are derived, instead of M, N being the number of additional matrices for the JCCR case. One or more basic embodiments use N=2*6. The step 304 of derivation of matrixId is also modified since Table 7-6 comprises two more entries for the cases of TuCResMode is 2, one entry for the case CuPredMode=MODE_INTRA, one entry for the case CuPredMode=MODE_INTER, or MODE_IBC. In the example table above, the new matrixId values are 6 and 7. The modified blocks are in bold font. Of course, a different ordering of the rows, and matrixId values associated to each case, can be considered.

In an alternative, new scaling lists, not signaled in the stream, but inferred from other signaled scaling lists, are added. And the new ScalingFactor matrices are directly derived from these new ScalingList matrices.

The derivation of the additional ScalingList matrices used for JCCR case (based on one or more basic embodiments, 2*6 matrices are needed) is achieved as follows.

```
for( sizeId = 1; sizeId < 7; sizeId++ )
  for i = 0 to Min( 63, ( 1 << ( sizeId << 1 ) ) - 1 )
    ScalingList[ sizeId ][ 6 ][ i ] =
      f( ScalingList[ sizeId ][ 1 ][ i ], ScalingList[ sizeId ][ 2 ][ i ] )
    ScalingList[ sizeId ][ 7 ][ i ] =
      f( ScalingList[ sizeId ][ 4 ][ i ], ScalingList[ sizeId ][ 5 ][ i ] )
```

The function f( ) can be one of the examples given above. The (M+N) ScalingFactor matrices are then derived from the ScalingList as described in VVC.

Third Additional Embodiment

In a third additional embodiment, a new syntax element, named here ref_jccr_scaling_list_id, is added to indicate if the quantization matrices for the JCCR case are equal to the Cb or Cr ScalingFactor (or ScalingList) tables, or derived by mixing the Cb and Cr ScalingFactor (or ScalingList) tables.

Figure 6:
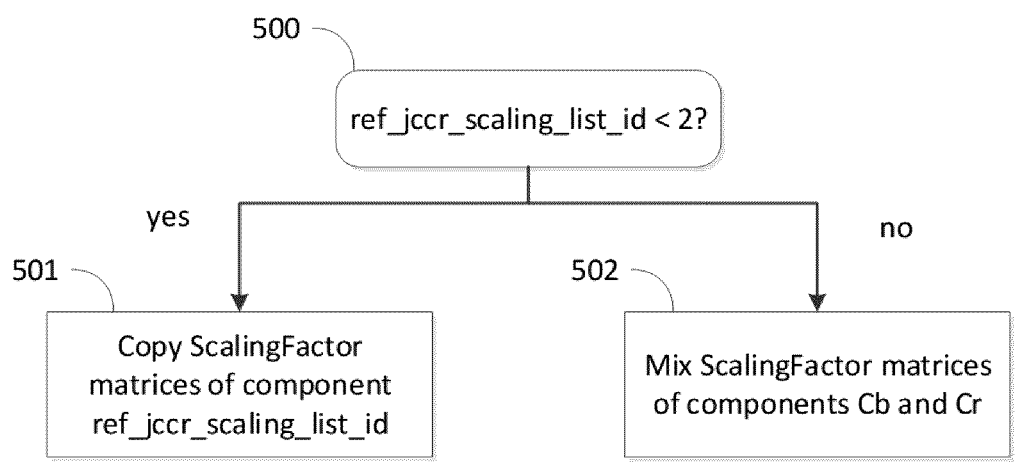
FIG. 6 depicts a block diagram of a selection process according to an example.

The selection process is illustrated in FIG. 6. An example of semantics is provided below.

The new syntax ref_jccr_scaling_list_id specifies the derivation process of the ScalingFactor (or ScalingList) tables applied when the JJCR mode applies (that is, when parameter TuCResMode[x0][y0] of a transform block at relative position x0,y0, is equal to 2).

If ref_jccr_scaling_list_id is lower than 2 (test of step 500), the ScalingFactor (or ScalingList) tables for JCCR (TuCResMode=2) are set to the same as the ScalingFactor (or ScalingList) tables for Cb or Cr (step 501). For instance, ScalingFactor for matrixId=6 and 7 are derived as follows:
for(sizeId=1;sizeId<7;sizeId++)
  for each horizontal/vertical frequency index x and y of a square TU of size specified by sizeId ScalingFactor[sizeId][sizeId][6][x][y]=ScalingFactor[sizeId][sizeId][1+ref_jccr_scaling_list_id][x][y]

ScalingFactor[sizeId][sizeId][7][x][y]=ScalingFactor[sizeId][sizeId][4+ref_jccr_scaling_list_id][x][y]

Otherwise (ref_jccr_scaling_list_id=2), the ScalingFactor (or ScalingList) tables for JCCR (TuCResMode=2) are obtained by mixing the ScalingFactor (or ScalingList) tables for Cb and for Cr (step 502). For instance, ScalingFactor for matrixId=6 and 7 are derived as follows:
for(sizeId=1;sizeId<7;sizeId++)
  for each horizontal/vertical frequency index x and y of a square TU of size specified by sizeId ScalingFactor[sizeId][sizeId][6][x][y]=f(ScalingFactor[sizeId][sizeId][1][x][y],ScalingFactor[sizeId][sizeId][2][x][y])

ScalingFactor[sizeId][sizeId][7][x][y]=f(ScalingFactor[sizeId][sizeId][4][x][y],ScalingFactor[sizeId][sizeId][5][x][y])

This application describes a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

The aspects described and contemplated in this application can be implemented in many different forms. FIGS. 2, 2A, 3, 3A and 7 below provide some embodiments, but other embodiments are contemplated and the discussion of FIGS. 2, 2A, 3, 3A and 7 does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably. Usually, but not necessarily, the term "reconstructed" is used at the encoder side while "decoded" is used at the decoder side.

Various methods are described herein, and each of the methods comprises one or more steps or actions for achieving the described method. Unless a specific order of steps or actions is required for proper operation of the method, the order and/or use of specific steps and/or actions may be modified or combined. Additionally, terms such as "first", "second", etc. may be used in various embodiments to modify an element, component, step, operation, etc., such as, for example, a "first decoding" and a "second decoding". Use of such terms does not imply an ordering to the modified operations unless specifically required. So, in this example, the first decoding need not be performed before the second decoding, and may occur, for example, before, during, or in an overlapping time period with the second decoding.

Figure 2:
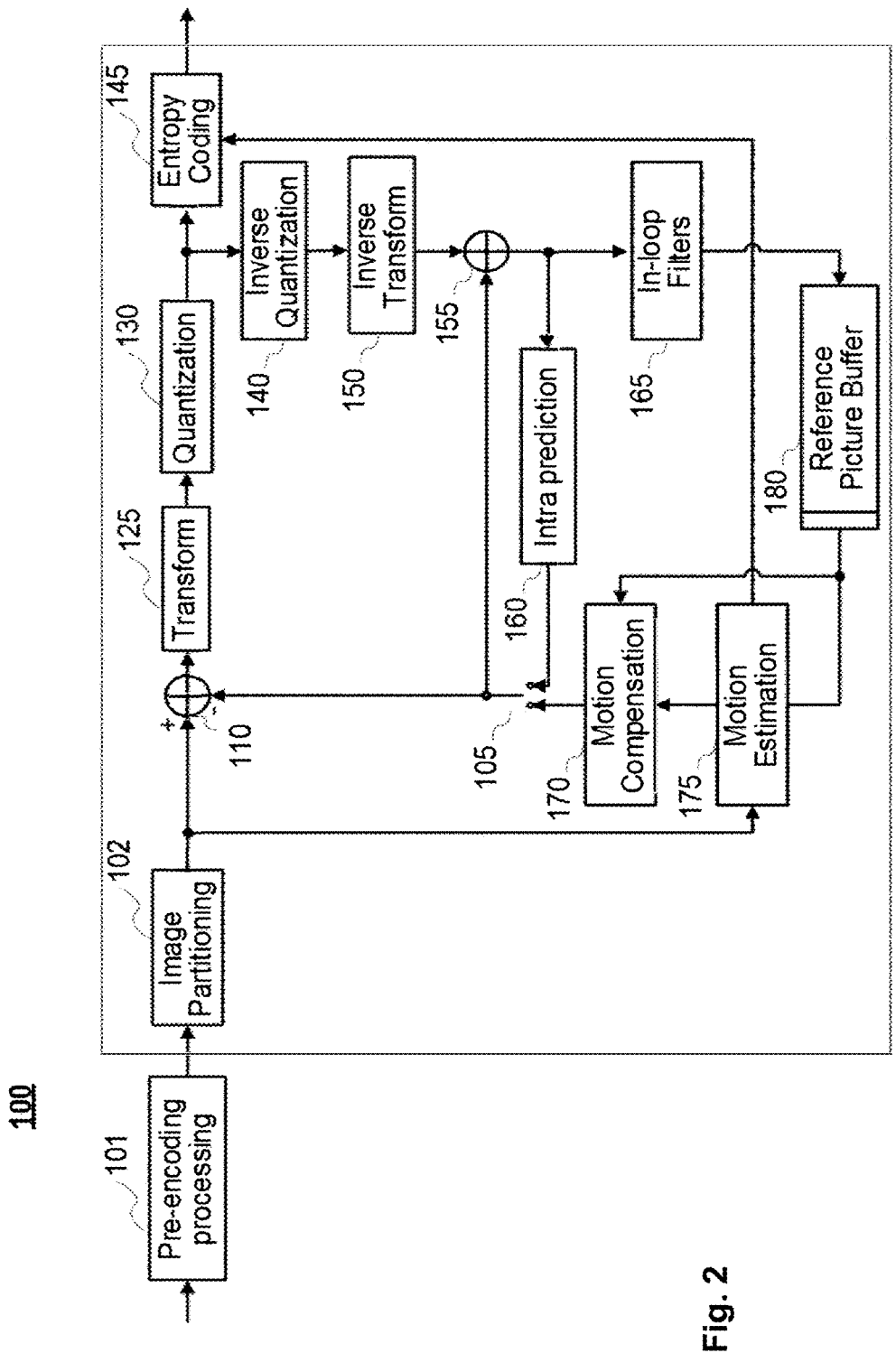
FIG. 2 illustrates a block diagram of an encoder.
Figure 2A:
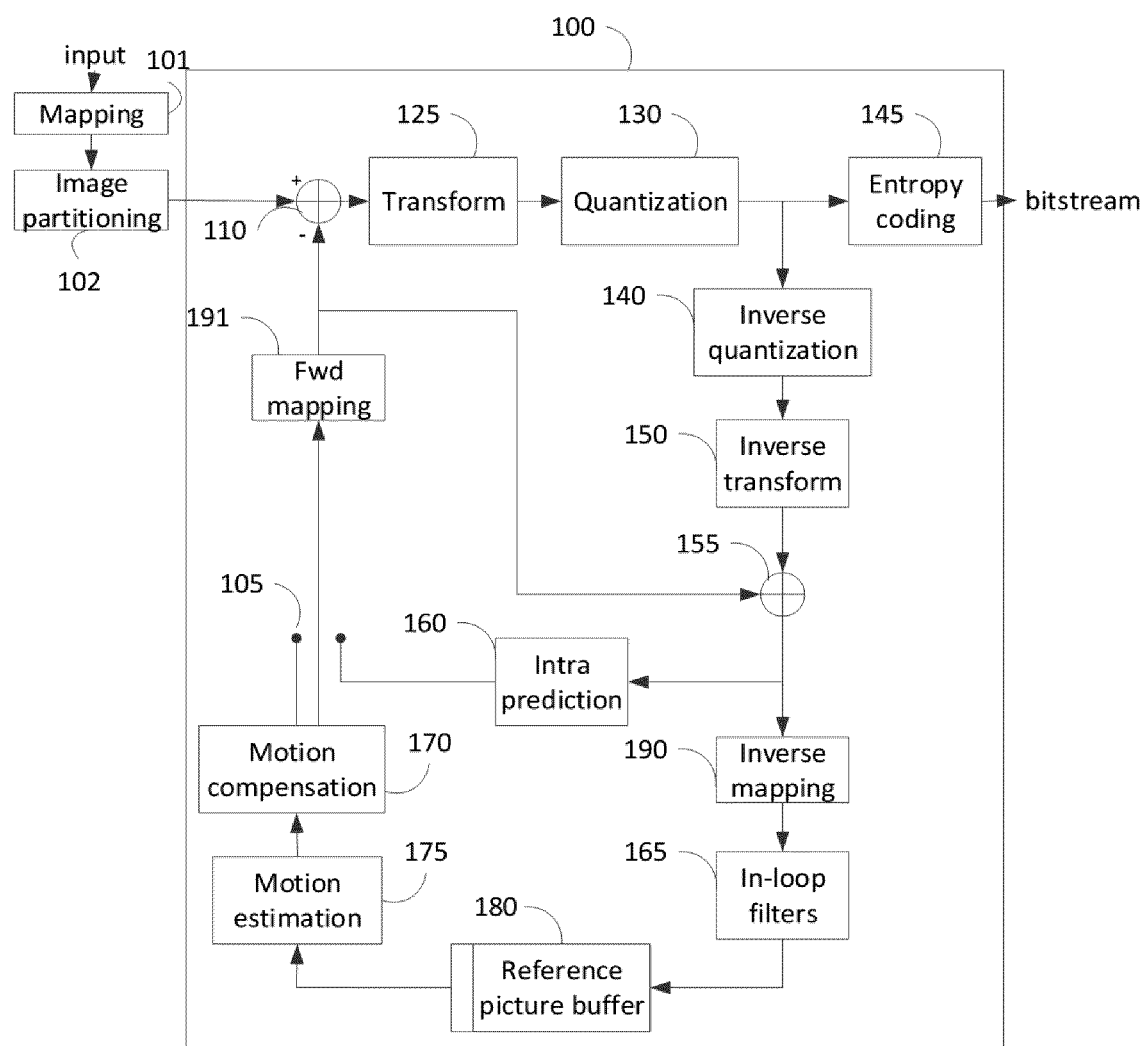
FIG. 2A illustrates another block diagram of another example of a video encoder.
Figure 3:
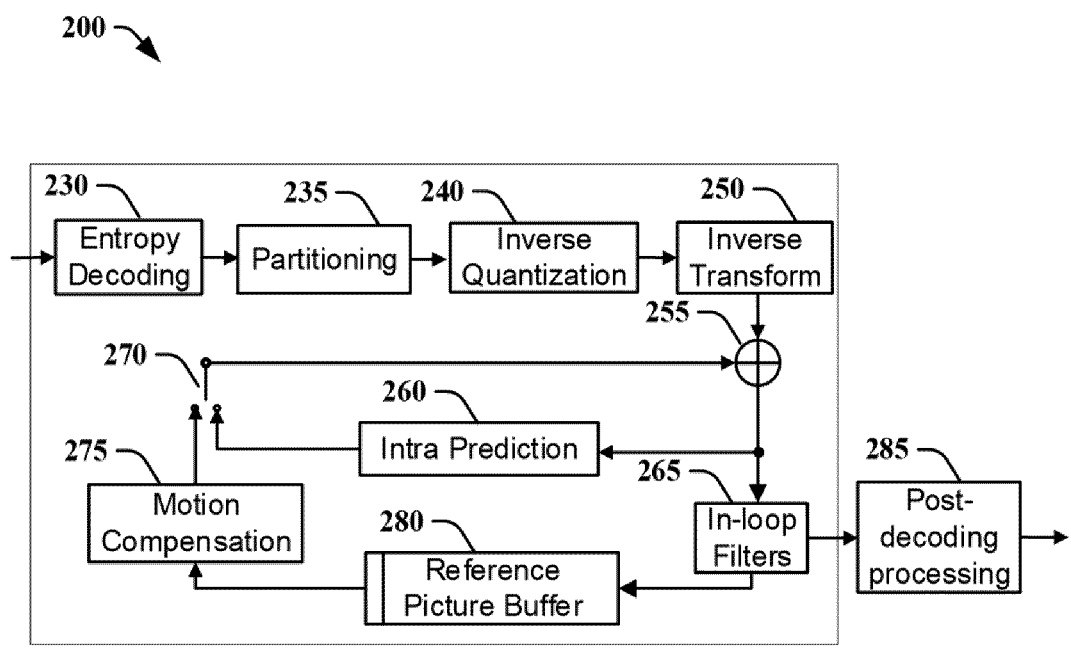
FIG. 3 illustrates a block diagram of a video decoder.
Figure 3A:
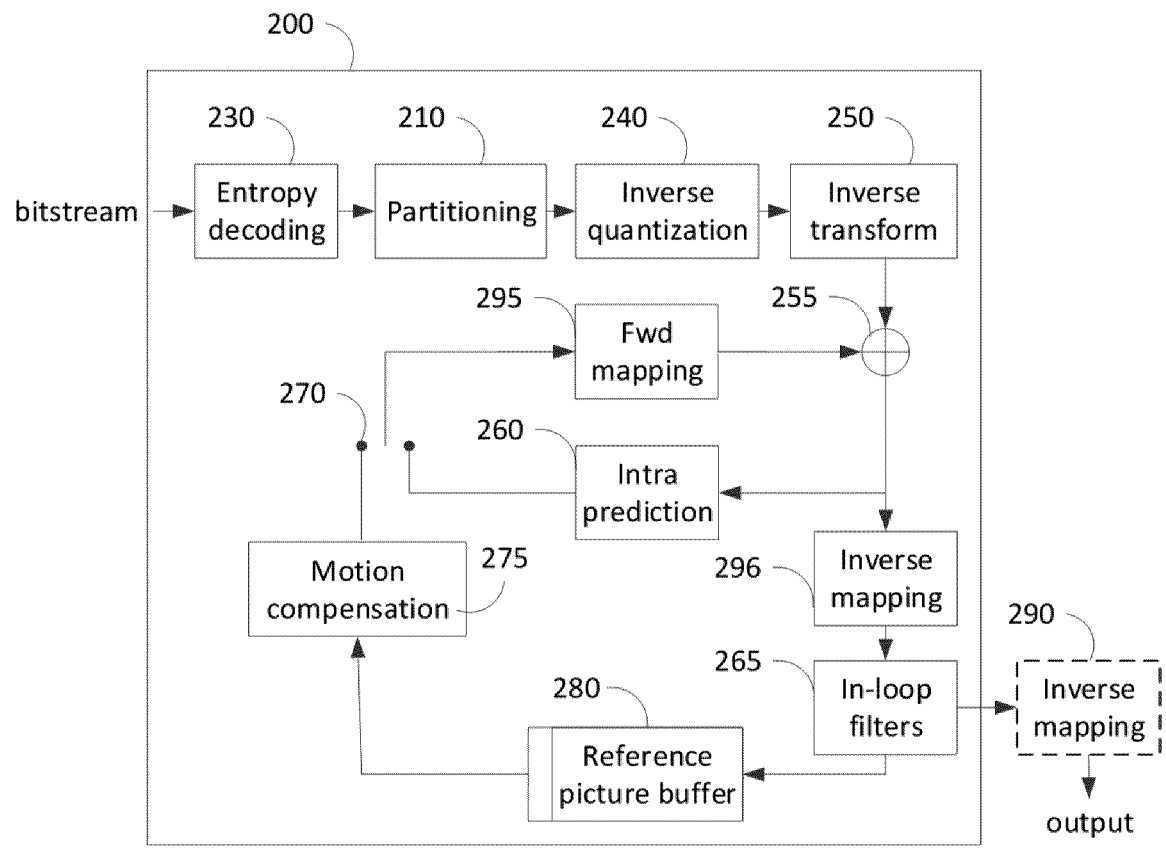
FIG. 3A illustrates a block diagram of another example of a video decoder.

Various methods and other aspects described in this application can be used to modify modules, for example, the quantization and inversed quantization modules (130, 140) of a video encoder 100 in FIGS. 2 and 2A; and inversed quantization module (240) of a decoder 200 as shown in FIGS. 3 and 3A. Moreover, the present aspects are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this application can be used individually or in combination.

Various numeric values are used in the present application. The specific values are for example purposes and the aspects described are not limited to these specific values.

FIG. 2 illustrates an encoder 100. Variations of this encoder 100 are contemplated, but the encoder 100 is described below for purposes of clarity without describing all expected variations.

Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing, and attached to the bitstream.

In the encoder 100, a picture is encoded by the encoder elements as described below. The picture to be encoded is partitioned (102) and processed in units of, for example, CUs. Each unit is encoded using, for example, either an intra or inter mode. When a unit is encoded in an intra mode, it performs intra prediction (160). In an inter mode, motion estimation (175) and compensation (170) are performed. The encoder decides (105) which one of the intra mode or inter mode to use for encoding the unit, and indicates the intra/inter decision by, for example, a prediction mode flag. Prediction residuals are calculated, for example, by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture to perform, for example, deblocking/SAO (Sample Adaptive Offset) filtering to reduce encoding artifacts. The filtered image is stored at a reference picture buffer (180).

FIG. 2A illustrates another block diagram of another example of a video decoder 200. FIG. 2A illustrates additionally, for example, luma mapping (101, 191, 190) and image partitioning (102) processes being applied as proposed in a VVC specification. Luma mapping consists of applying a luma forward mapping function Mapfwd(•) to the prediction luma samples. The luma forward mapping function Mapfwd(•) is based on a table, lumaMapTable, coded in the data stream, in which lumaMapTable indicates the slopes of the piece-wise linear luma mapping function Mapfwd(•). Each piece or segment is of uniform length, defined for an interval [Yi, Yi+1−1], i=0 to 15.

FIG. 3 illustrates a block diagram of a video decoder 200. In the decoder 200, a bitstream is decoded by the decoder elements as described below. Video decoder 200 generally performs a decoding pass reciprocal to the encoding pass as described in FIG. 2 or 2A. The encoder 100 also generally performs video decoding as part of encoding video data.

In particular, the input of the decoder includes a video bitstream, which can be generated by video encoder 100. The bitstream is first entropy decoded (230) to obtain transform coefficients, motion vectors, and other coded information. The picture partition information indicates how the picture is partitioned. The decoder may therefore divide (235) the picture according to the decoded picture partitioning information. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). In-loop filters (265) are applied to the reconstructed image. The filtered image is stored at a reference picture buffer (280).

The decoded picture can further go through post-decoding processing (285), for example, an inverse color transform (e.g. conversion from YCbCr 4:2:0 to RGB 4:4:4) or an inverse remapping performing the inverse of the remapping process performed in the pre-encoding processing (101). The post-decoding processing can use metadata derived in the pre-encoding processing and signaled in the bitstream.

FIG. 3A illustrates another block diagram of another example of a video decoder 200 which corresponds to the encoder 100 with the additional mapping (101, 190, 191) and image partitioning (102) functions shown in FIG. 2A. The corresponding decoding functions are shown in, e.g., modules 210, 290, 295 and 296 of the decoder 200 in FIG. 3A.

Figure 7:
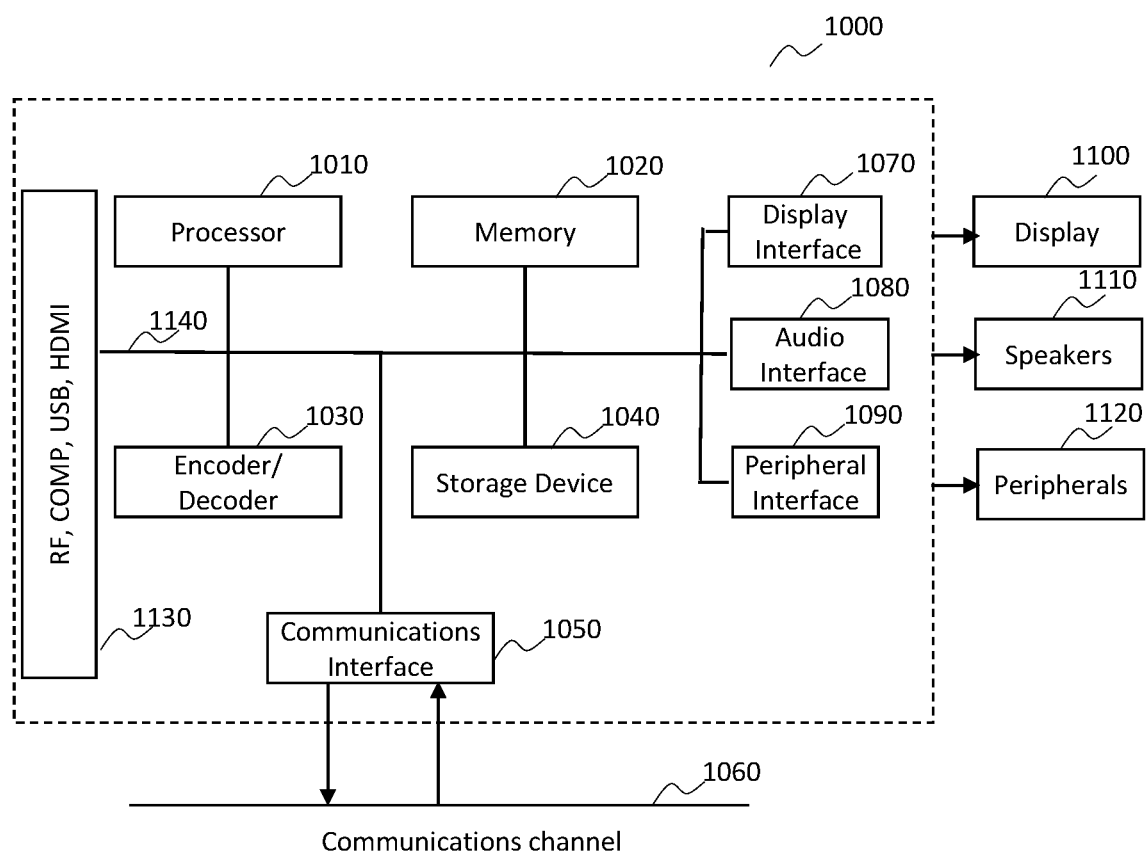
FIG. 7 illustrates a block diagram of an example of a system in which various aspects and embodiments can be implemented.

FIG. 7 illustrates a block diagram of an example of a system in which various aspects and embodiments are implemented. System 1000 can be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit (IC), multiple ICs, and/or discrete components. For example, in at least one embodiment, the processing and encoder/decoder elements of system 1000 are distributed across multiple ICs and/or discrete components. In various embodiments, the system 1000 is communicatively coupled to one or more other systems, or other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 1040 can include an internal storage device, an attached storage device (including detachable and non-detachable storage devices), and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of, for example, a television. In at least one embodiment, a fast external dynamic volatile memory such as a RAM is used as working memory for video coding and decoding operations, such as for MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or VVC (Versatile Video Coding, a new standard being developed by JVET, the Joint Video Experts Team).

The input to the elements of system 1000 can be provided through various input devices as indicated in block 1130. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 7, include composite video.

In various embodiments, the input devices of block 1130 have associated respective input processing elements as known in the art. For example, the RF portion can be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010 as necessary. Similarly, aspects of USB or HDMI interface processing can be implemented within separate interface ICs or within processor 1010 as necessary. The demodulated, error corrected, and demultiplexed stream is provided to various processing elements, including, for example, processor 1010, and encoder/decoder 1030 operating in combination with the memory and storage elements to process the datastream as necessary for presentation on an output device.

Various elements of system 1000 can be provided within an integrated housing, Within the integrated housing, the various elements can be interconnected and transmit data therebetween using suitable connection arrangement 1140, for example, an internal bus as known in the art, including the Inter-IC (I2C) bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data are streamed, or otherwise provided, to the system 1000, in various embodiments, using a wireless network such as a Wi-Fi network, for example IEEE 802.11 (IEEE refers to the Institute of Electrical and Electronics Engineers). The Wi-Fi signal of these embodiments is received over the communications channel 1060 and the communications interface 1050 which are adapted for Wi-Fi communications. The communications channel 1060 of these embodiments is typically connected to an access point or router that provides access to external networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130. As indicated above, various embodiments provide data in a non-streaming manner. Additionally, various embodiments use wireless networks other than Wi-Fi, for example a cellular network or a Bluetooth network.

The system 1000 can provide an output signal to various output devices, including a display 1100, speakers 1110, and other peripheral devices 1120. The display 1100 of various embodiments includes one or more of, for example, a touchscreen display, an organic light-emitting diode (OLED) display, a curved display, and/or a foldable display. The display 1100 can be for a television, a tablet, a laptop, a cell phone (mobile phone), or other device. The display 1100 can also be integrated with other components (for example, as in a smart phone), or separate (for example, an external monitor fora laptop). The other peripheral devices 1120 include, in various examples of embodiments, one or more of a stand-alone digital video disc (or digital versatile disc) (DVR, for both terms), a disk player, a stereo system, and/or a lighting system. Various embodiments use one or more peripheral devices 1120 that provide a function based on the output of the system 1000. For example, a disk player performs the function of playing the output of the system 1000.

In various embodiments, control signals are communicated between the system 1000 and the display 1100, speakers 1110, or other peripheral devices 1120 using signaling such as AV.Link, Consumer Electronics Control (CEC), or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device such as, for example, a television. In various embodiments, the display interface 1070 includes a display driver, such as, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

Figure 8:
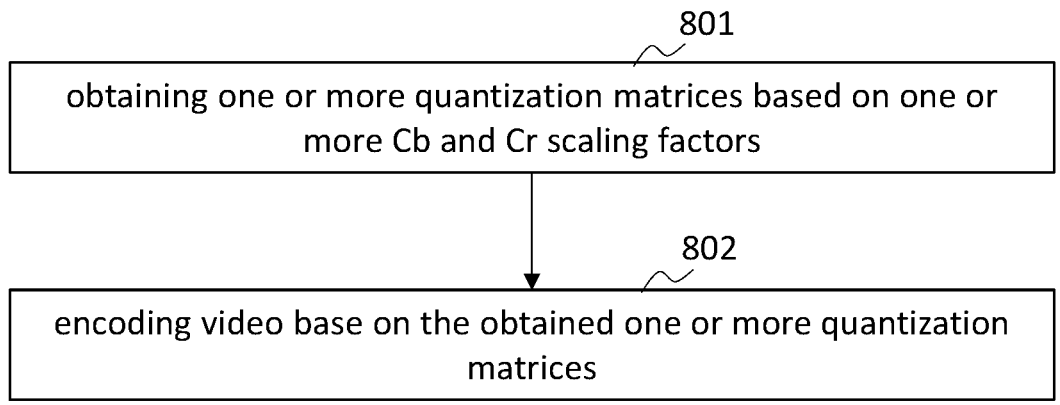
FIG. 8 illustrates an example of a video encoding process.

FIG. 8 illustrates an example of a video encoding process according to one or more aspects of the present embodiments. In 801, one or more quantization matrices are obtained based on one or more Cb and Cr scaling factors. In 802, the video is encoded based on the obtained one or more quantization matrices.

Figure 9:
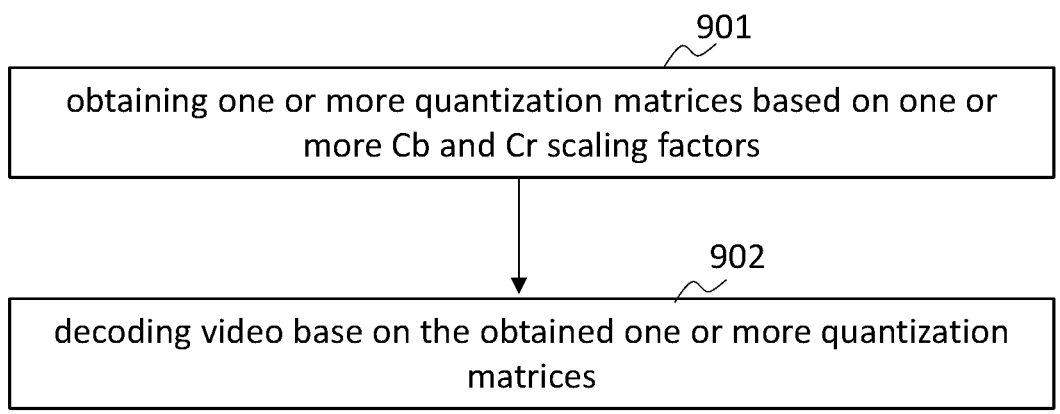
FIG. 9 illustrates an example of a video decoding process.

FIG. 9 illustrates an example of a video decoding process according to one or more aspects of the present embodiments. In 901, one or more quantization matrices are obtained based on one or more Cb and Cr scaling factors. In 902, the video is decoded based on the obtained one or more quantization matrices.

Various implementations described herewith involve decoding. "Decoding", as used in this application, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application, for example, extracting and determining one or more parameters related to the improved JCCR mode as described herewith.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream. In various embodiments, such processes include one or more of the processes typically performed by an encoder, for example, partitioning, differential encoding, transformation, quantization, and entropy encoding.

In various embodiments, such processes also, or alternatively, include processes performed by an encoder of various implementations described in this application, for example, for the enhanced JCCR mode as described herewith.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein, for example, ref_jccr_scaling_list_id and ScalingFactor are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments refer to rate distortion optimization. In particular, during the encoding process, the balance or trade-off between the rate and distortion is usually considered, often given the constraints of computational complexity. The rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment. Additionally, this application may refer to "determining" various pieces of information. Determining the information can include one or more of, for example, estimating the information, calculating the information, predicting the information, or retrieving the information from memory.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of a plurality of parameters for JCCR mode. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

We describe a number of embodiments. Features of these embodiments can be provided alone or in any combination. Various other generalized, as well as particularized, aspects, embodiments and claims are also supported and contemplated throughout this disclosure. Further, embodiments can include one or more of the following features, devices, or aspects, alone or in any combination, across various claim categories and types:

Quantization matrices depend on one or more Cb and Cr scaling factors.

Quantization matrices according to any of the described embodiments are specific to the JCCR mode.

Quantization matrices according to any of the described embodiments are used when the JCCR mode is applied.

Quantization matrices according to any of the described embodiments are used in the inverse quantization process.

Quantization matrices according to any of the described embodiments that do not require additional scaling lists to be signaled.

Derivation of new scaling factors when JCCR is used, without additional signaling.

Derivation of new scaling factors from new scaling lists.

In another alternative, a new syntax element, for example, referred to as ref_jccr_scaling_list_id, is added to indicate if the quantization matrices for the JCCR case are equal to the Cb or Cr scaling factors, or derived by mixing the Cb and Cr scaling factors or scaling lists.

A bitstream or signal that includes one or more of the described syntax elements, or variations thereof.

A bitstream or signal that includes syntax conveying information generated according to any of the embodiments described.

Inserting, into the signaling syntax, elements that enable the decoder to adapt residues in a manner corresponding to that used by an encoder.

Creating and/or transmitting and/or receiving and/or decoding a bitstream or signal that includes one or more of the described syntax elements, or variations thereof.

Creating and/or transmitting and/or receiving and/or decoding according to any of the embodiments described.

A method, process, apparatus, medium storing instructions, medium storing data, or signal according to any of the embodiments described.

A TV, set-top box, cell phone, tablet, or other electronic device that performs adaptation of filter parameters according to any of the embodiments described.

A TV, set-top box, cell phone, tablet, or other electronic device that performs adaptation of filter parameters according to any of the embodiments described, and that displays (e.g. using a monitor, screen, or other type of display) a resulting image.

A TV, set-top box, cell phone, tablet, or other electronic device that selects (e.g. using a tuner) a channel to receive a signal including an encoded image, and performs adaptation of filter parameters according to any of the embodiments described.

A TV, set-top box, cell phone, tablet, or other electronic device that receives (e.g. using an antenna) a signal over the air that includes an encoded image, and performs adaptation of filter parameters according to any of the embodiments described.

The invention claimed is:

1. A method for reconstructing a block of an image, the method comprising:
   determining that one single residual block is signaled for both a first chroma component of the block and a second chroma component of the block different from the first chroma component;
   responsive to the determining, deriving a quantization matrix by mixing a first scaling list associated with the first chroma compenent and a second scaling list associated with the second chroma component or by mixing first and second scaling factor matrices derived from the first and second scaling lists respectively; and
   applying the derived quantization matrix to the single residual block to obtain a reconstructed residual block for each of the first and second chroma components.

2. The method of claim 1, wherein the first scaling factor matrix is derived from thefirst scaling list associated with the first chroma component and the second scaling factor matrix is derived from the second scaling list associated with the second chroma component.

3. The method of claim 1, wherein mixing the first and second scaling factor matrices comprises applying a function to the first and second scaling factor matrices, the function being representative of an average or a weighted average of the first and second scaling factor matrices and wherein mixing the first and second scaling lists comprises applying a function to the first and second scaling lists, the function being representative of an average or a weighted average of the first and second scaling lists.

4. The method of claim 2, comprising decoding the first scaling list and the second scaling list from a bitstream representative of the image.

5. The method of claim 1, comprising decoding a syntax element indicating if the quantization matrix applied to the single residual block is derived by mixing the first and second scaling factor matrices or the first and second scaling lists or is equal to one scaling list or one scaling factor matrix associated with one component among of the first and second chroma components.

6. A device for reconstructing a block of an image, the device comprising one or more processors and at least one memory coupled to the one or more processors, wherein the one or more processors are configured to perform:
  determining that one single residual block is signaled for both a first chroma component of the block and a second chroma component of the block different from the first chroma component;
  responsive to the determining deriving a quantization matrix by mixing a first scaling list associated with the first chroma component and a second scaling list associated with the second chroma component or by mixing first and second scaling matrices; and
  applying the derived quantization matrix to the single residual block to obtain a reconstructed residual block for each of the first and second chroma components.

7. The device of claim 6, wherein the first scaling factor matrix is derived from the first scaling list associated with the first chroma component and the second scaling factor matrix is derived from the second scaling list associated with the second chroma component.

8. The device of claim 6, wherein mixing the first and second scaling factor matrices comprises applying a function to the first and second scaling factor matrices, the function being representative of an average or a weighted average of the first and second scaling factor matrices and wherein mixing the first and second lists comprises applying a function to the first and second scaling lists, the function being representative of an average or a weighted average of the first and second scaling lists.

9. The device of claim 7, wherein the one or more processors are configured to perform decoding the first scaling list and the second scaling list from a bitstream representative of the image.

10. The device of claim 6, wherein the one or more processors are configured to perform decoding a syntax element indicating if the quantization matrix applied to the single residual block is derived by mixing the first and second scaling factor matrices or the first and second scaling lists or is equal to one scaling list or one scaling factor matrix associated with one component among the first and second chroma components.

11. A method for encoding a block of an image, the method comprising:
  determining that one single residual block is signaled for both a first chroma component of the block and a second chroma component of the block different from the first chroma component;
  responsive to the determining deriving a quantization matrix by mixing a first scaling list associated with the first chroma component and a second scaling list associated with the second chroma component or by mixing first and second scaling factor matrices derived from the first and second scaling lists respectively; and
  applying the derived quantization matrix to the single residual block to obtain a reconstructed residual block for each of the first and second chroma components.

12. The method of claim 11, wherein the first scaling factor matrix is derived from the first scaling list associated with the first chroma component and the second scaling factor matrix is derived from the second scaling list associated with the second chroma component.

13. The method of claim 11, wherein mixing the first and second scaling factor matrices comprises applying a function to the first and second scaling factor matrices, the function being representative of an average or a weighted average of the first and second scaling factor matrices and wherein mixing the first and second scaling lists comprises applying a function to the first and second scaling lists, the function being representative of an average or a weighted average of the first and second scaling lists.

14. The method of claim 12, comprising encoding the first scaling list and the second scaling list in a bitstream representative of the image.

15. The method of claim 11, comprising encoding a syntax element indicating if the quantization matrix applied to the single residual block is derived by mixing the first and second scaling factor matrices or the first and second scaling lists or is equal to one scaling list or one scaling factor matrix associated with one component among the first and second chroma components.

16. A device for encoding a block of an image, the device comprising one or more processors and at least one memory coupled to the one or more processors, wherein the one or more processors are configured to perform:
  determining that one single residual block is signaled for both a first chroma component of the block and a second chroma component of the block different from the first chroma component;
  responsive to the determining, obtaining a first scaling factor matrix associated with the first chroma component and a second scaling factor matrix associated with the second chroma component;
  deriving a quantization matrix by mixing a first scaling list associated with the first chroma component and a second scaling list associated with the second chroma component or by mixing first and second scaling factor matrices derived from the first and second scaling lists respectively; and
  applying the derived quantization matrix to the single residual block to obtain a reconstructed residual block for each of the first and second chroma components.

17. The device of claim 16, wherein the first scaling factor matrix is derived from the first scaling list associated with the first chroma component and the second scaling factor matrix is derived from the second scaling list associated with the second chroma component.

18. The device of claim 16, wherein mixing the first and second scaling factor matrices comprises applying a function to the first and second scaling factor matrices, the function being representative of an average or a weighted average of the first and second scaling factor matrices and wherein mixing the first and second scaling lists comprises applying a function to the first and second scaling lists, the function being representative of an average or a weighted average of the first and second scaling lists.

19. The device of claim 17, wherein the one or more processors are configured to perform encoding the first scaling list and the second scaling list in a bitstream representative of the image.

20. The device of claim 16, wherein the one or more processors are configured to perform encoding a syntax element indicating if the quantization matrix applied to the single residual block is derived by mixing the first and second scaling factor matrices or the first and second scaling lists or is equal to one scaling list or one scaling factor matrix associated with one component among the first and second chroma components.

* * * * *

UNITED STATES PATENT AND TRADEMARK OFFICE
CERTIFICATE OF CORRECTION

PATENT NO. : 12,206,852 B2  
APPLICATION NO. : 17/766005  
DATED : January 21, 2025  
INVENTOR(S) : Edouard Francois et al.

Page 1 of 1

It is certified that error appears in the above-identified patent and that said Letters Patent is hereby corrected as shown below:

In the Claims

Column 22, Line 44: Replace "compenent" with -- component --

Column 22, Line 52: Replace "thefirst" with -- the first --

Column 23, Line 6: Delete "of"

Column 23, Line 20: Replace "scaling matrices; and" with -- scaling factor matrices derived from the first and second scaling lists respectively; and --

Column 23, Line 34: Replace "second lists" with -- second scaling lists --

Signed and Sealed this  
Twenty-ninth Day of April, 2025

Coke Morgan Stewart  
*Acting Director of the United States Patent and Trademark Office*